(12) United States Patent
Kim et al.

(10) Patent No.: US 9,104,253 B2
(45) Date of Patent: Aug. 11, 2015

(54) DISPLAY DEVICE

(75) Inventors: Hye-Sun Kim, Yongin (KR); Eun-Ah Kim, Yongin (KR)

(73) Assignee: Samsung Display Co., Ltd., Gyeonggi-do (KR)

(*) Notice: Subject to any disclaimer, the term of this patent is extended or adjusted under 35 U.S.C. 154(b) by 1191 days.

(21) Appl. No.: 13/043,406

(22) Filed: Mar. 8, 2011

(65) Prior Publication Data
US 2012/0127091 A1 May 24, 2012

(30) Foreign Application Priority Data

Nov. 19, 2010 (KR) .................. 10-2010-0115572

(51) Int. Cl.
| | |
|---|---|
| *G02F 1/1335* | (2006.01) |
| *G06F 3/041* | (2006.01) |
| *G06F 3/042* | (2006.01) |
| *G06F 3/043* | (2006.01) |
| *G06F 3/045* | (2006.01) |
| *G02F 1/1333* | (2006.01) |

(52) U.S. Cl.
CPC ............ *G06F 3/041* (2013.01); *G02F 1/13338* (2013.01); *G02F 2001/133331* (2013.01); *G02F 2201/503* (2013.01); *G06F 2203/04103* (2013.01)

(58) Field of Classification Search
USPC ..................... 349/12; 345/173–178
See application file for complete search history.

(56) References Cited

U.S. PATENT DOCUMENTS

| | | | | |
|---|---|---|---|---|
| 7,792,558 | B2* | 9/2010 | Bang et al. ................ | 455/575.4 |
| 8,587,533 | B2* | 11/2013 | Nishihara et al. ........... | 345/173 |
| 8,686,965 | B2* | 4/2014 | Mi .............................. | 345/174 |
| 2008/0165139 | A1* | 7/2008 | Hotelling et al. ............. | 345/173 |

FOREIGN PATENT DOCUMENTS

| | | |
|---|---|---|
| KR | 10-1998-019660 A | 6/1998 |
| KR | 10-2006-0134662 A | 12/2006 |

\* cited by examiner

*Primary Examiner* — Hoan C Nguyen
(74) *Attorney, Agent, or Firm* — Knobbe, Martens, Olson & Bear, LLP

(57) ABSTRACT

A display device is disclosed. In one embodiment, the device includes: i) a display panel having a display area and a peripheral area, ii) a touch panel disposed corresponding to the display area on the display panel, iiii) a connecting portion extending from an edge of the touch panel to an edge of the display panel and iv) a window disposed on the touch panel, and including a window main body covering the display area and the peripheral area and a black matrix portion covering the peripheral area. The device may further include a resin layer disposed between the window and the touch panel and cured with light and a reinforcing tape attached to the peripheral area of the display panel and attached between the connecting portion and the display panel, and having a groove recessed corresponding to the connecting portion.

10 Claims, 5 Drawing Sheets

DISPLAY DEVICE

RELATED APPLICATIONS

This application claims priority to and the benefit of Korean Patent Application No. 10-2010-0115572 filed in the Korean Intellectual Property Office on Nov. 19, 2010, the entire contents of which are incorporated herein by reference.

BACKGROUND

1. Field

The described technology generally relates to a display device, and more particularly, to a display device comprising a window.

2. Description of the Related Technology

Flat panel displays are classified into a liquid crystal display (LCD), a plasma display panel (PDP), an organic light emitting diode display (OLED), etc depending on the type of display panel included in a display device.

SUMMARY

One inventive aspect is a display device, which has a resin layer corresponding to a peripheral area of a display panel fully cured.

Another aspect is a display device comprising: a display panel comprising a display area and a peripheral area; a touch panel disposed corresponding to the display area on the display panel; a connecting portion extending from an edge of the touch panel to an edge of the display panel; a window disposed on the touch panel, and comprising a window main body covering the display area and the peripheral area and a black matrix portion covering the peripheral area; a resin layer disposed between the window and the touch panel and cured with light; and reinforcing tape attached to the peripheral area of the display panel and attached between the connecting portion and the display panel, and comprising a groove recessed corresponding the connecting portion.

The display panel may include: a first substrate having a first width; and a second substrate disposed on the first substrate and having a second width less than the first width, and the reinforcing tape may be attached to the first substrate exposed to the second substrate.

A first height from the upper surface of the first substrate to the upper surface of the reinforcing tape corresponding to the groove may be less than a second height from the upper surface of the first substrate to the upper surface of the second substrate.

A third height from the upper surface of the first substrate to the upper surface of the reinforcing tape may be greater than the second height.

The resin layer corresponding to the display area may be cured with a first light transmitted through the window, and the resin layer corresponding to the peripheral area may be cured with a second light irradiated onto a side of the display panel.

The display device may further include a driver disposed on the back surface of the display panel and connected to the connecting portion passed through the edge of the display panel.

The connecting portion may include a flexible printed circuit board (FPCB).

The display panel may include liquid crystal or an organic light emitting diode.

The light may have a wavelength of the ultraviolet spectrum.

According to one of several embodiments of the solution according to the described technology, there is provided a display device in which a resin layer corresponding to a peripheral area of a display panel is fully cured.

DETAILED DESCRIPTION

Figure 1:
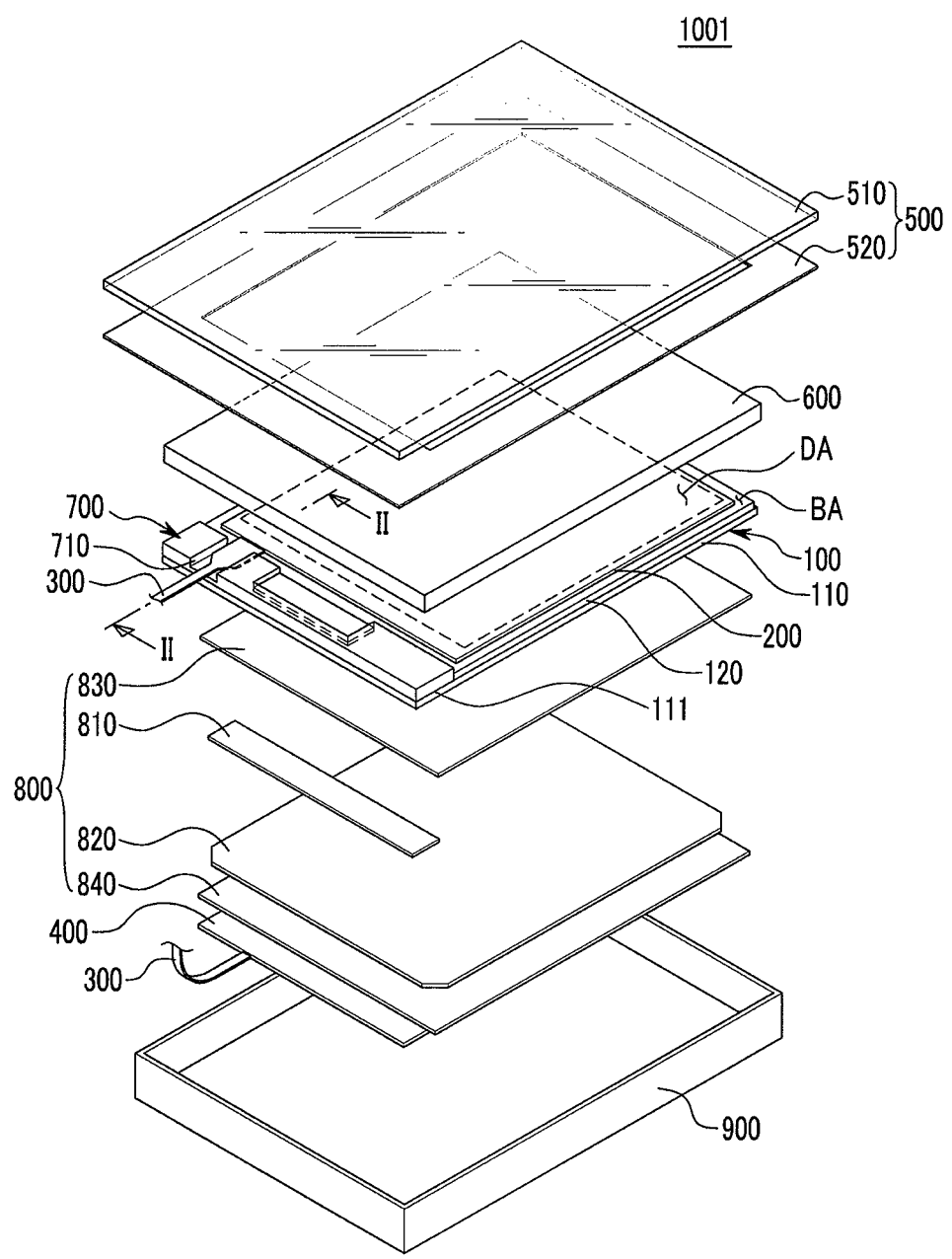
FIG. 1 is an exploded perspective view showing a display device according to a first embodiment.

A flat panel display generally includes a window on a display panel housed in a housing member to prevent interference with the display panel. Such a display device has a resin layer disposed between the display panel and the window to join the display panel and the window together.

Ultraviolet light is irradiated on the resin layer through the window or irradiated on the resin layer between the display panel and the window from a side of the display device to cure the resin layer disposed between the display panel and the window.

Meanwhile, the display panel includes a display area for displaying an image and a peripheral area adjacent to the display area, and there has been a problem that a portion of the resin layer corresponding to the peripheral area is not fully cured.

In the following detailed description, only certain embodiments have been shown and described, simply by way of illustration. As those skilled in the art would realize, the described embodiments may be modified in various different ways.

Elements irrelevant to the disclosed embodiments are omitted from the details of this description, and like reference numerals refer to like elements throughout the specification.

In several embodiments, constituent elements having the same configuration are representatively described in a first embodiment by using the same reference numeral and only constituent elements other than the constituent elements described in the first embodiment will be described in other embodiments.

Further, the size and thickness of each component shown in the drawings are arbitrarily shown for better understanding and ease of description, and are not considered limiting.

In the drawings, thickness is shown to be greater in order to clearly represent multiple layers and areas. In the drawings, the thicknesses of layers, regions, and areas may be exaggerated for the sake of clarity. It will be understood that when an element such as a layer, film, region, area or panel is referred to as being "on" another element, it can be directly on the other element or intervening elements may also be present.

In addition, unless explicitly described to the contrary, the word "comprise" and variations such as "comprises" or "comprising", will be understood to imply the inclusion of stated elements but not the exclusion of any other elements. Throughout the specification, the term "on" represents that an element is above or below another element, but does not represents that an element is positioned at an upper position of a gravity direction.

Hereinafter, a display device 1001 according to a first embodiment will be described with reference to FIGS. 1 and 2. The display device 1001 according to the first embodiment will be described taking a liquid crystal display as an example, whereas a display device according to another embodiment may be an organic light emitting diode display having a window or a plasma display panel having a window.

FIG. 1 is an exploded perspective view showing a display device according to a first embodiment. FIG. 2 is a cross-sectional view taken along line II-II of FIG. 1.

Figure 2:
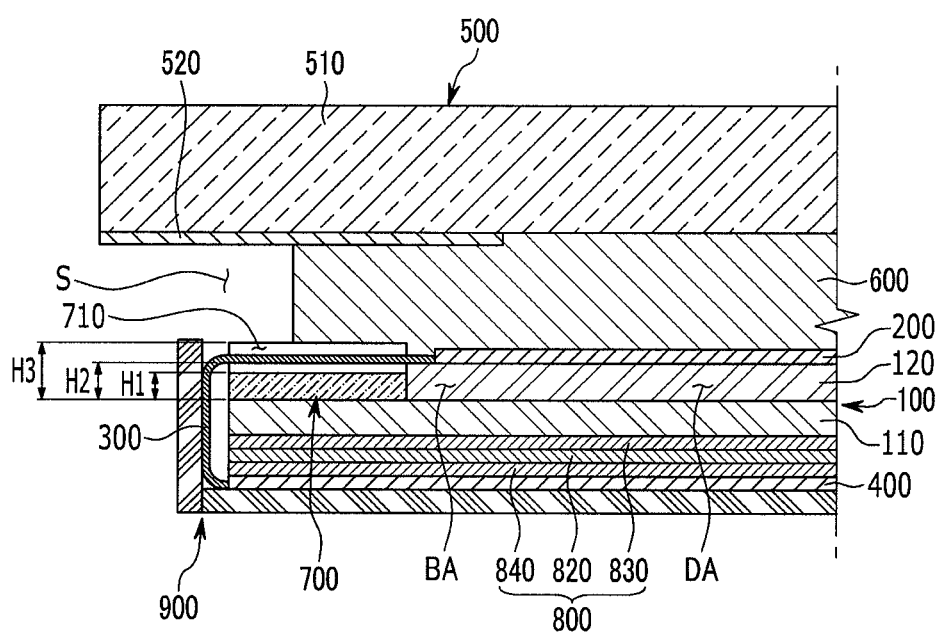
FIG. 2 is a cross-sectional view taken along line II-II of FIG. 1.

As shown in FIGS. 1 and 2, the display device 1001 includes a display panel 100, a touch panel 200, a connecting portion 300, a driver 400, a window 500, a resin layer 600, reinforcing tape 700, a backlight unit 800, and a housing member 900.

The display panel 100 includes liquid crystal, and uses the liquid crystal to display an image using light irradiated from the backlight unit 800. The display panel 100 includes a first substrate 110 and a second substrate 120 facing each other and liquid crystal disposed between the facing substrates. Wiring is formed on one or more of the first and second substrates 110 and 120 facing each other, and the liquid crystal is moved by a magnetic field generated by the wiring, whereby the amount of light irradiated onto the display panel 100 from the backlight unit 800 is adjusted, thus displaying an image on the display panel 100. A polarization plate for changing the optical axis of light irradiated onto the display panel 100 or exiting through the display panel 100 may be attached to one or more of the front and back surfaces of the display panel 100. The display panel 100 includes a display area DA for displaying an image and a peripheral area BA adjacent to the display area DA. The peripheral area BA of the display panel 100 surrounds the display area DA, but may be formed in various forms without being limited to this example.

In one embodiment, the first substrate 110 has a first width, and the second substrate 120 has a second width smaller than the first width. In this embodiment, as the second substrate 120 has a smaller width than the first substrate 110, the second substrate 120 exposes a portion 111 of the first substrate 110 corresponding to the peripheral area BA.

A touch panel 200 is disposed on the display panel 100.

The touch panel 200 is disposed on the display panel 100, corresponding to the display area DA of the display panel 100, and perceives a touch of a touching means, such as a pen, a finger, etc. and transmits a signal corresponding to the touched position to the driver 400. The touch panel 200 is used as input means for the display device 1001, and may be configured in a pressure sensitive type or electrostatic capacity type.

In one embodiment, the touch panel 200 is disposed separately from the display panel 100. However, the touch panel 200 may be formed on the second substrate 120 of the display panel 100.

The connecting portion 300 is connected to an edge of the touch panel 200 and extends from the edge of the touch panel 200 to an edge of the display panel 100. The connecting portion 300 extends to the driver 400 through the edge of the display panel 100 and is connected to the driver 400. That is, the connecting portion 300 connects the touch panel 200 and the driver 400. The connecting portion 300 includes a flexible printed circuit board (FPCB).

While he connecting portion 300 according to the first embodiment includes a flexible printed circuit board, the connecting portion according to another embodiment may comprise connecting means having conductivity such as a cable.

The driver 400 is disposed on the back surface of the display panel 100. More specifically, the driver 40 faces the display panel 100 with the backlight unit 800 interposed therebetween. The driver 400 is connected to the connecting portion 300 passing through the edge of the display panel 100, and receives a signal corresponding to a touch perceived by the touch panel 200 through the connecting portion 300. The driver 400 can generate a driving signal for driving the display panel 100 based on a touch signal, which is a signal corresponding to the touch received through the connecting portion 300, and then transmit the driving signal to the display panel 100.

The window 500 is disposed on the display panel 100, with the touch panel 200 and the resin layer 600 interposed therebetween.

The window 500 is disposed on the touch panel 200, and includes a window main body 510 and a black matrix portion 520 which face the display panel 100.

In one embodiment, the window main body 510 is made of a transparent material such as glass or resin, and serves to protect the display panel 100 and the touch panel 200 so as to prevent the display panel 100 and the touch panel 200 from being broken by external impact. The window main body 510 faces the touch panel 200 on the display panel 100, and covers the display area DA and peripheral area BA of the display panel 100. The window main body 510 is attached to the touch panel 200 and the display panel 100 by the resin layer 600 disposed between the display panel 100 and the window 500, and protects, together with the resin layer, the touch panel 200 and the display panel 100 and improves the impact resistance of the display device 1001. Although the window main body 510 is formed to be greater in size than the touch panel 200 and the display panel 100, the window main body 510 is not limited thereto but may be formed in substantially the same size as the touch panel 200 or the display panel.

The black matrix portion 520 is formed in a shape substantially corresponding to the peripheral area BA of the display panel 100, and covers the peripheral area BA. The black matrix portion 520 prevents the peripheral area BA from being visible from the environment. The black matrix portion 520 includes a light-absorbing material such as chrome.

The resin layer 600 is disposed between the window 500 and the touch panel 200.

The resin layer 600 is disposed between the touch panel 200 and the window 500, and may be disposed between the display panel 100 and the housing member 900. The resin layer 600 is disposed between the touch panel 200 and the window 500 to thus prevent the formation of an air gap between the touch panel 200 and the window 500 and at the same time prevent the presence of any foreign material such as dirt between the touch panel 200 and the window 500. By preventing an air gap or foreign material from being disposed between the touch panel 200 and the window 500, a distortion of an image displayed on the display panel 100 is prevented.

Moreover, the resin layer 600 serves to attach the window 500 to the touch panel 200 and the display panel 100, and therefore protects, together with the window 500, the touch panel 200 and the display panel 100, thus improving the impact resistance of the display device 1001. The resin layer 600 includes ultraviolet curable resin, and is prepared, cured with light having an ultraviolet wavelength. Particularly, a portion of the entire resin layer 600 substantially corresponding to the display area DA is cured with light transmitted through the window 500, and a portion of the resin layer 600 substantially corresponding to the peripheral area BA is cured with light irradiated to a side of the display panel 100.

The reinforcing tape 700 is disposed between the resin layer 600 and the first substrate 110.

The reinforcing tape 700 is disposed between the connecting portion 300 and the display panel 100, and attached to the peripheral area BA. Specifically, the reinforcing tape 700 is attached to a portion 111 of the first substrate 110 exposed by the second substrate 120. As the reinforcing tape 700 is attached to the portion 111 of the first substrate 110, it serves to reinforce the thickness of a portion of the first substrate 110 having a smaller thickness than the entire display panel 100. By attaching the reinforcing tape 700 to the portion 111 of the first substrate 110 to reinforce the entire thickness of the display panel 100, the breakage of the display panel due to external impact is minimized.

The reinforcing tape 700 includes a groove 710, and the groove 710 is recessed from the upper surface of the reinforcing tape 700, substantially corresponding to the connecting portion 300. As a consequence, referring to FIG. 2, a first height H1 from the upper surface of the first substrate 110 to the upper surface of the reinforcing tape 700 is less than a second height H2 from the upper surface of the first substrate 110 to the upper surface of the second substrate 120. Hence, the connecting portion 300 is disposed within the groove 710 of the reinforcing tape 700. Because of the connecting portion 300 being disposed within the groove 710 of the reinforcing tape 700, the connecting portion 300 is not disposed in a space S between the reinforcing tape 700 and the window 500. Thus, the portion of the resin layer 600 substantially corresponding to the peripheral area BA of the display panel 100 is easily cured with light irradiated to the side of the display panel 100.

Moreover, with the groove 710 being disposed substantially corresponding to the connecting portion 300, a third height H3 from the upper surface of the first substrate 110 to the upper surface of the reinforcing tape 700 not corresponding to the connecting portion 300 becomes higher than the aforementioned second height H2. As a result, the overall thickness of the display panel 100 is reinforced by the reinforcing tape 700, thus improving the impact resistance of the display panel 100.

As seen above, as the reinforcing tape 700 reinforces the overall thickness of the display panel 100 by having the groove 710 recessed substantially corresponding to the connecting portion 300, the impact resistance of the display panel 100 is improved, and at the same time the connecting portion 300 is prevented from being disposed in the space S between the reinforcing tape 700 and the window 500. Hence, the portion of the resin layer 600 substantially corresponding to the peripheral area BA is fully cured.

The backlight unit 800 irradiates light to the display panel 100, and includes a light emitting portion 810, a light guide plate 820, an optical sheet 830, and a reflective sheet 840.

The light emitting portion 810 generates light, and disposed substantially corresponding to the edge of the light guide plate 820. The light generated from the light emitting portion 810 is irradiated onto the light guide plate 820, and the light irradiated onto the light guide plate 820 is irradiated in the direction of the display panel 100 by the light guide plate 820. The light emitting portion 810 may be a dot light source or line light source, and the light irradiated from the light emitting portion 810 is converted into a surface light source and irradiated in the direction of the display panel 100.

The light guide plate 820 is disposed between the optical sheet 830 and the reflective sheet 840, and serves to convert the light irradiated from the light emitting portion 810 into a surface light source and irradiate it onto the display panel 100.

The optical sheet 830 serves to deform the light irradiated from the light guide plate 820 to improve the display quality of an image displayed by the display panel 100. The optical sheet 830 may include a diffusion sheet, a prism sheet, a protective sheet, etc.

The reflective sheet 840 is disposed between the light guide plate 820 and the housing member 900, and serves to reflect the light irradiated onto the reflective sheet 840 through the light guide plate 820 again in the direction of the light guide plate 820 so that the light emitted from the light emitting portion 810 and passed through the light guide plate 820 is irradiated onto the display panel 100.

The display device 1001 according to the first embodiment may further include a mold frame supporting the backlight unit 8100, and the above-described display panel 100, driver 400, backlight unit 800, and mold frame may be housed in the housing member 900.

The housing member 900 houses the display panel 100, the driver 400, and the backlight unit 800 therein, and may be formed of a material having a greater strength than the window 500. The housing member 900 may be manufactured from a metal, such as stainless steel, cold-rolled steel plate, and an aluminum-nickel-silver alloy.

The following description will be made with respect to a case where the resin layer 600 is cured with light with reference to FIG. 3.

Figure 3:
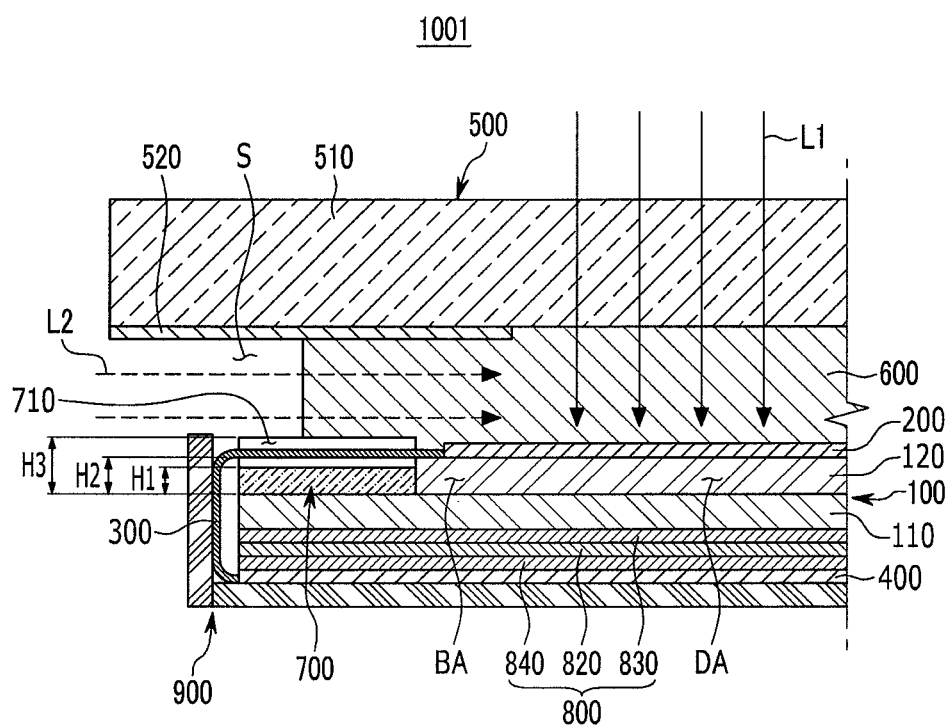
FIG. 3 is a cross-sectional view showing an optical path for curing the resin layer in FIG. 2.

FIG. 3 is a cross-sectional view showing an optical path for curing the resin layer in FIG. 2.

As shown in FIG. 3, in order to cure the resin layer 600 included in the display device 1001, the display device 1001 irradiates a first light L1 having an ultraviolet wavelength to the resin layer 600 disposed between the window 500 and the display panel 100 through the window 500 to fully cure the resin layer 600 disposed between the window 500 and the display panel 100. At this time, the first light L1 is blocked by the black matrix portion 520 substantially corresponding to the peripheral area BA, so only the portion of the resin layer 600 substantially corresponding to the display area DA, except the portion of the resin layer 600 substantially corresponding to the peripheral area BA is fully cured.

Subsequently, in order to fully cure the portion of the resin layer 600 substantially corresponding to the peripheral area BA, a second light L2 having an ultraviolet wavelength is irradiated in the space S between the display panel 100 and the window 500 from a side of the display device 1001 toward the side of the display panel 100, thus fully curing the portion of the resin layer 600 corresponding to the peripheral area BA of the display panel 100. Since the connecting portion 300 is disposed in the groove 710 of the reinforcing tape 700, the second light L2 transmitted through the space S between the reinforcing tape 700 and the window 500 and fully cures the portion of the resin layer 600 substantially corresponding to the peripheral area BA of the display panel 100.

In this manner, the resin layer 600 disposed between the display panel 100 and the window 500 is fully cured altogether.

As seen from above, the display device 1001 is improved in the attachment of the touch panel 200 and the window 500 to the display panel 100 because the resin layer 600 is fully cured altogether and the reinforcing tape 700 is attached to the display panel 100 and reinforces the overall thickness of the display panel 100. Consequently, the overall impact resistance of the display device 1001 is improved.

Moreover, the display device 1001 according to the first embodiment prevents the distortion of an image caused by a blur generated in the resin layer 600 in case of failure to fully cure the resin layer 600.

In addition, because the resin layer 600 is fully cured, the display device 1001 according to the first embodiment prevents the formation of an air gap between the display panel 100 and the window 500 and the touch panel 200 and the window 500 and the presence of a foreign material such as dirt between the display panel 100 and the window 500 and between the touch panel 200 and the window 500. This prevents the distortion of an image displayed on the display panel 100 caused by the air gap or foreign material.

The following description will be made with respect to a display device 1002 according to a second embodiment with reference to FIGS. 4 and 5. The display device 1002 will be described taking an organic light emitting diode display as an example.

Figure 4:
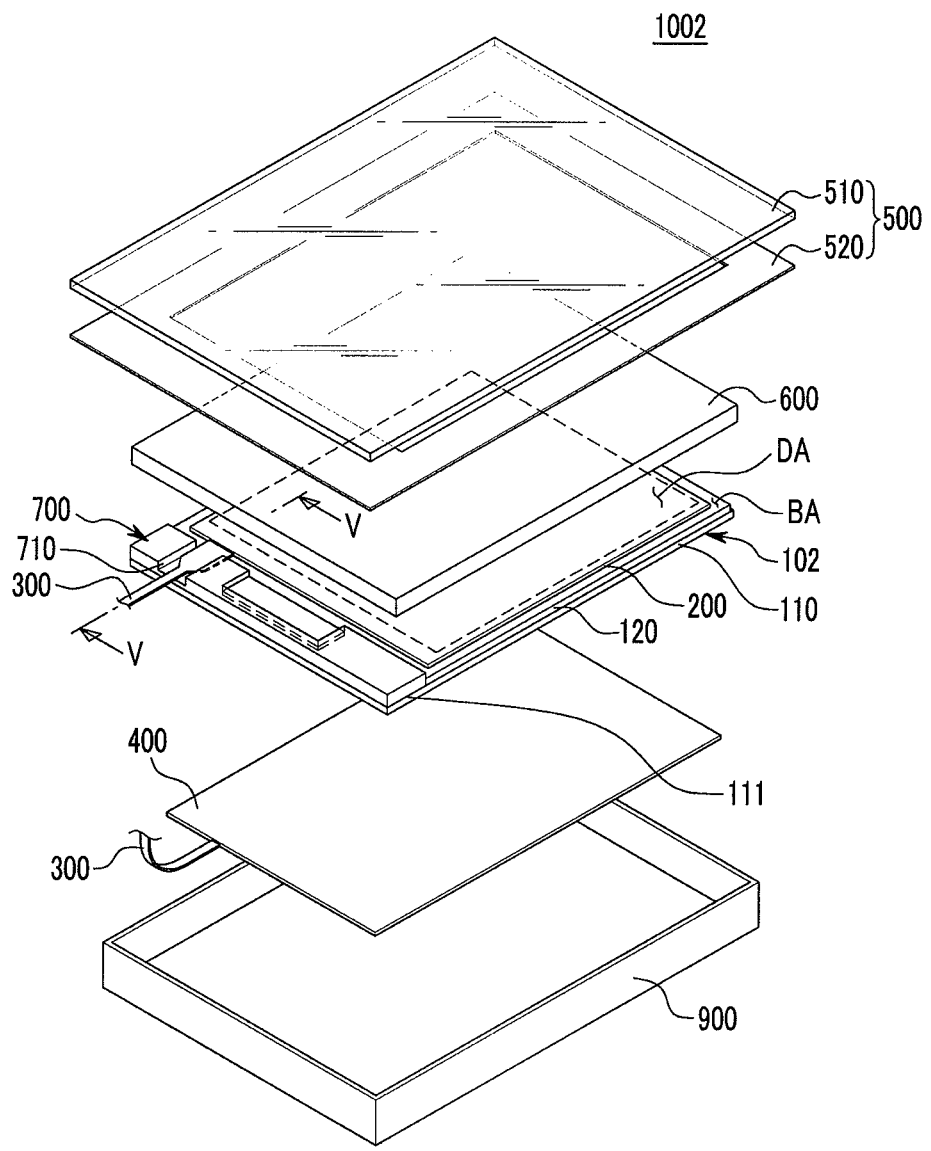
FIG. 4 is an exploded perspective view showing a display device according to a second embodiment.

FIG. 4 is an exploded perspective view showing a display device according to a second embodiment. FIG. 5 is a cross-sectional view taken along line V-V.

Figure 5:
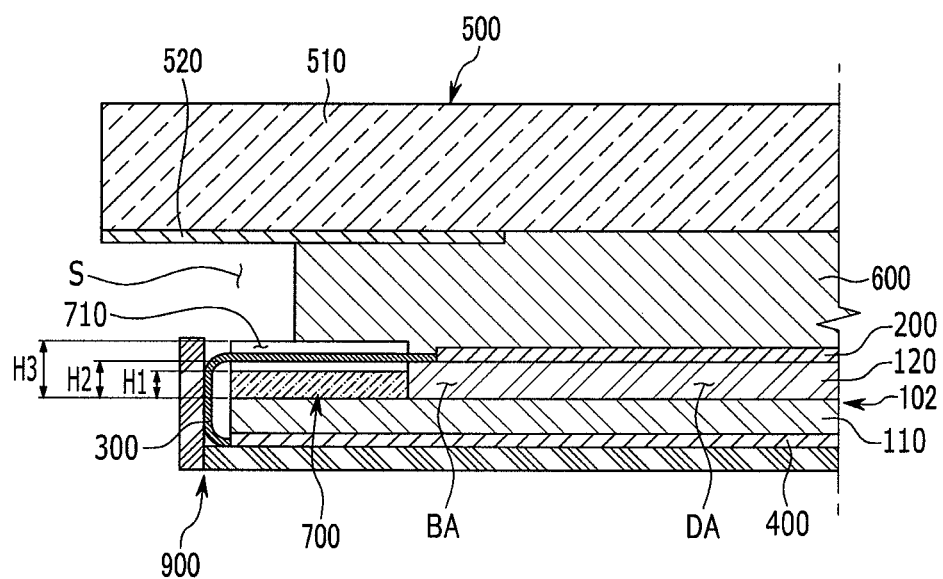
FIG. 5 is a cross-sectional view taken along line V-V.

As shown in FIGS. 4 and 5, the display device 1002 includes a display panel 102, a touch panel 200, a connecting portion 300, a drier 400, a window 500, a resin layer 600, a reinforcing tape 700, and a housing member 900.

The display panel 102 includes an organic light emitting diode, and displays an image using the self-luminous capability of the organic light emitting diode.

The display panel 102 includes a first substrate 110 and a second substrate 120 facing each other and the organic light emitting diode disposed between the substrates facing each other. Wiring is formed on one or more of the first and second substrates 110 and 120 facing each other, and the organic light emitting diode comprising an organic emission layer having self-luminous capability emits light, thus displaying an image on the display panel 102.

A polarization plate for changing the optical axis of light irradiated from the display panel 102 may be attached to the front surface of the display panel 102. The display panel 102 includes a display area DA for displaying an image and a peripheral area BA adjacent to the display area DA. The peripheral area BA surrounds the display area DA, but may be formed in various forms without being limited to this example.

The touch panel 200 to which the connecting portion 300 is connected, the resin layer 600, and the window 500 are disposed on the display panel 102, and a reinforcing tape 700 comprising a groove 710 substantially corresponding to the connecting portion 300 is attached to the peripheral area BA.

As seen from above, the display device 1002 is improved in the attachment of the touch panel 200 and the window 500 to the display panel 102 because the resin layer 600 is fully cured altogether and the reinforcing tape 700 is attached to the display panel 100 and reinforces the overall thickness of the display panel 102. Consequently, the overall impact resistance of the display device 1002 is improved.

Moreover, the display device 1002 prevents the distortion of an image caused by a blur generated in the resin layer 600 in case of failure to fully cure the resin layer 600.

In addition, because the resin layer 600 is substantially fully cured, the display device 1002 prevents the formation of an air gap between the display panel 102 and the window 500 and the touch panel 200 and the window 500 and the presence of a foreign material such as dirt between the display panel 102 and the window 500 and between the touch panel 200 and the window 500. This prevents the distortion of an image displayed on the display panel 102 caused by the air gap or foreign material.

While this disclosure has been described in connection with certain embodiments, it is to be understood that t the disclosed embodiments are not considered limiting. Thus, various modifications and equivalent arrangements are included within the spirit and scope of the appended claims.

What is claimed is:

1. A display device comprising:
   a display panel comprising a display area and a peripheral area;
   a touch panel placed substantially corresponding to the display area on the display panel;
   a connecting portion extending from an edge of the touch panel to an edge of the display panel;
   a window placed on the touch panel, wherein the window comprises i) a window main body covering the display area and the peripheral area and ii) a black matrix portion covering the peripheral area;
   a resin layer formed between the window and the touch panel, wherein the resin layer directly contacts the black matrix portion; and
   a reinforcing tape attached to the peripheral area of the display panel and attached between the connecting portion and the display panel, wherein a groove, recessed substantially corresponding to the connecting portion, is formed in the reinforcing tape, and
   wherein the resin layer is closer to the reinforcing tape than the window.

2. The display device of claim 1, wherein the display panel comprises:
   a first substrate having a first width; and
   a second substrate disposed on the first substrate and having a second width less than the first width, wherein the reinforcing tape is attached to the first substrate exposed to the second substrate.

3. The display panel of claim 2, wherein a first height measured from the upper surface of the first substrate to the upper surface of the reinforcing tape substantially corresponding to the groove is less than a second height measured from the upper surface of the first substrate to the upper surface of the second substrate.

4. The display device of claim 3, wherein a third height measured from the upper surface of the first substrate to the upper surface of the reinforcing tape is greater than the second height.

5. The display device of claim 1, wherein a first light transmitted through the window is configured to cure the resin layer substantially corresponding to the display area, and
   wherein a second light irradiated onto a side of the display panel is configured to cure the resin layer substantially corresponding to the peripheral area.

6. The display device of claim 1, wherein the display device further comprises a driver disposed on the back surface of the display panel and connected to the connecting portion passed through the edge of the display panel.

7. The display device of claim 6, wherein the connecting portion includes a flexible printed circuit board (FPCB).

8. The display device of claim 1, wherein the display panel includes liquid crystal or an organic light emitting diode.

9. The display device of claim 1, wherein the light has a wavelength of the ultraviolet spectrum.

10. The display device of claim 1, wherein the resin layer is continuously formed.

* * * * *